(12) United States Patent
Ouyang et al.

(10) Patent No.: US 10,503,049 B2
(45) Date of Patent: Dec. 10, 2019

(54) PHOTONIC CRYSTAL MEMORY TYPE ALL-OPTICAL "AOR" LOGIC GATE

(71) Applicant: Zhengbiao Ouyang, Shenzhen, Guangdong (CN)

(72) Inventors: Zhengbiao Ouyang, Guangdong (CN); Quanqiang Yu, Guangdong (CN)

(73) Assignee: Zhengbiao Ouyang, Shenzhen (CN)

( * ) Notice: Subject to any disclaimer, the term of this patent is extended or adjusted under 35 U.S.C. 154(b) by 164 days.

(21) Appl. No.: 15/626,293

(22) Filed: Jun. 19, 2017

(65) Prior Publication Data
US 2017/0293201 A1    Oct. 12, 2017

Related U.S. Application Data

(63) Continuation of application No. PCT/CN2015/097844, filed on Dec. 18, 2015.

(30) Foreign Application Priority Data

Dec. 19, 2014   (CN) .......................... 2014 1 0799755

(51) Int. Cl.
| | | |
|---|---|---|
| *G02F 1/365* | (2006.01) | |
| *G02F 3/00* | (2006.01) | |
| *G02B 6/122* | (2006.01) | |
| *G02B 6/125* | (2006.01) | |
| *B82Y 20/00* | (2011.01) | |
| *G02B 6/12* | (2006.01) | |

(52) U.S. Cl.
CPC .............. *G02F 1/365* (2013.01); *G02B 6/125* (2013.01); *G02B 6/1225* (2013.01); *G02F 3/00* (2013.01); *B82Y 20/00* (2013.01); *G02B 2006/1213* (2013.01); *G02F 2202/32* (2013.01)

(58) Field of Classification Search
CPC .... G02B 6/1223; G02B 6/1225; G02B 6/125; G02F 1/365; G02F 2201/06; G02F 2202/32
See application file for complete search history.

(56) References Cited

U.S. PATENT DOCUMENTS

2006/0062507 A1   3/2006   Yanik et al.

FOREIGN PATENT DOCUMENTS

CN           101251701 A   *   8/2008

OTHER PUBLICATIONS

International Search Report of PCT Patent Application No. PCT/CN2015/097844 dated Mar. 18, 2016.

* cited by examiner

*Primary Examiner* — Robert E. Tallman
(74) *Attorney, Agent, or Firm* — Zhihua Han

(57) ABSTRACT

The present invention discloses a photonic crystal memory type all-optical "AOR" logic gate, and including photonic crystal structure; the photonic crystal structure includes two input ports, an output port and an idle port; a first input end and a second input end of the photonic crystal structure are respectively connected with a signal A and a signal B. The present invention has the advantages in high contrast of high and low logic output, high in computing speed, strong in anti-interference capability, and ease of integration with other optical logic elements.

12 Claims, 4 Drawing Sheets

| A | B | C | Y |
|---|---|---|---|
| 0 | 0 | 0 | 0 |
| 0 | 0 | 1 | 0 |
| 0 | 1 | 0 | 0 |
| 0 | 1 | 1 | 1 |
| 1 | 0 | 0 | 0 |
| 1 | 0 | 1 | 0 |
| 1 | 1 | 0 | 1 |
| 1 | 1 | 1 | 1 |

FIG. 4

PHOTONIC CRYSTAL MEMORY TYPE ALL-OPTICAL "AOR" LOGIC GATE

CROSS-REFERENCE TO RELATED APPLICATION

This application is a continuation application of PCT Application No. PCT/CN2015/097844 filed on Dec. 18, 2015, which claims priority to Chinese Patent Application No. 201410799755.2 filed on Dec. 19, 2014, the entire contents of which are hereby incorporated by reference.

FIELD OF THE INVENTION

The present invention relates to a two-dimensional (2D) photonic crystal (PhC) and optical "AOR" logic gate.

BACKGROUND OF THE INVENTION

In 1987, the concept of PhC was proposed separately by E. Yablonovitch from United States Bell Labs who discussed how to suppress spontaneous radiation and by S. John from Princeton University who made discussions about photonic localization. A PhC is a material structure in which dielectric materials are arranged periodically in space, and is usually an artificial crystal including of two or more materials having different dielectric constants.

With the emergence of and in-depth search on PhC, people can control the motion of photons in a PhC material more flexibly and effectively. In combination with traditional semiconductor processes and integrated circuit technologies, design and manufacture of PhC and devices thereof have continually and rapidly marched towards all-optical processing, and PhC has become a breakthrough for photonic integration. In December 1999, PhC was recognized by the American influential magazine Science as one of the top-ten scientific advances in 1999, and therefore has become a hot topic in today's scientific research field.

An all-optical logic device mainly includes an optical amplifier-based logic device, a non-linear loop mirror logic device, a Sagnac interference type logic device, a ring cavity logic device, a multi-mode interference logic device, an optical waveguide coupled logic device, a photoisomerized logic device, a polarization switch optical logic device, a transmission grating optical logic device, etc. These optical logic devices have the common shortcoming of large size in developing large-scale integrated optical circuits. With the improvement of science and technology in recent years, people have also done research and developed quantum optical logic devices, nano material optical logic devices and PhC optical logic devices, which all conform to the dimensional requirement of large-scale photonic integrated optical circuits. For modern manufacturing processes, however, the quantum optical logic devices and the nanomaterial optical logic devices are very difficult to be manufactured, whereas the PhC optical logic devices have competitive advantages in terms of manufacturing process.

In recent years, PhC logic devices have become a hot area of research drawing widespread attentions, and it is highly likely for them to replace the current widely-applied electronic logic devices in the near future.

In the process of realizing all-optical computing, PhC logical function devices based on "AND", "OR", "NOT", "XOR" gate and the like have been successfully designed and researched, and various complex logic components are still needed for achieving the goal of all-optical computing.

SUMMARY OF THE INVENTION

The present invention is aimed at overcoming the defects of the prior art and providing a PhC memory type all-optical "AOR" logic gate which is simple in structure, and strong in anti-interference capability.

In order to solve the above technical problems, the present invention adopts the following technical solution:

A PhC memory type all-optical "AOR" logic gate of the present invention includes PhC structure, said PhC structure includes two input port, an output port and an idle port; a first input port and a second input port of said PhC structure are respectively connected with a signal A and a signal B.

The PhC structure unit is a 2D PhC cross-waveguide nonlinear cavity, twelve rectangular high-refractive-index linear-dielectric pillars and one square nonlinear-dielectric pillar are arranged in a center of said 2D PhC cross-waveguide nonlinear cavity in a form of a quasi-one-dimensional (1D) PhC along longitudinal and transverse waveguide directions, the central nonlinear-dielectric pillar clings to the four adjacent rectangular linear-dielectric pillars, and said square nonlinear-dielectric pillar is made of a Kerr type nonlinear material, and has a dielectric constant of 7.9 under low-light-power conditions; the high-refractive-index linear-dielectric pillar has a dielectric constant being the same as that of a nonlinear-dielectric pillar under low-light-power conditions.

The high-refractive-index linear-dielectric pillars are constituted by a 2D PhC cross-waveguide four-port network, two mutually-orthogonal quasi-1D PhC structures are placed in two waveguide directions crossed at said center of across waveguide, the square nonlinear-dielectric pillar is arranged in the middle of the cross waveguide, said dielectric pillar is made of a nonlinear material, and said quasi-1D PhC structures and said dielectric pillar constitute a waveguide defect cavity.

The PhC is a (2k+1)×(2k+1) array structure, where k is an integer more than or equal to 3.

The cross section of the high-refractive-index linear-dielectric pillar of the 2D PhC is circular, elliptic, triangular or polygonal.

The dielectric pillar in the quasi-1D PhC of said cross waveguide has a refractive index of 3.4 or a different value more than 2.

The cross section of said central dielectric pillar is square, polygonal, circular or elliptic.

The cross section of said dielectric pillar in the quasi-1D PhC of the cross waveguide is rectangular, polygonal circular or elliptic.

A background filling material for said 2D PhC includes air or a different low-refractive-index dielectric having a refractive index less than 1.4.

Compared with the prior art, the present invention has the advantages:

1. The type all-optical "AOR" logic gate device has the advantages of compact structure, high and low logic output contrasts, quick in response, and ease of integration with other optical logic elements;
2. Based on the logic characteristics of a 2D PhC cross-waveguide nonlinear cavity and based on a PhC memory type all-optical "AOR" logic gate, the functions of multiple optical logic devices, e.g. an all-optical D trigger, an all-optical anti-interference trigger switch, an all-optical "AND" transformation logic gate, etc., can be realized by adding unit devices such as an optical switch, a memory or delayer and the like.

3. The all-optical "AOR" logic gate device can directly carry out all-optical logic functions of "AND", "OR", "NOT" gate and the like, is a core device for realizing all-optical computing, and is compact in structure, strong in anti-interference capability and high in computing speed.

These and other objects and advantages of the present invention will become readily apparent to those skilled in the art upon reading the following detailed description and claims and by referring to the accompanying drawings.

BRIEF DESCRIPTION OF THE DRAWINGS

In FIG. 1, indications are: first signal input port 1, second signal input port 2, idle port 3, output port 4, circular high-refractive-index linear-dielectric pillar 5, first rectangular high-refractive-index linear-dielectric pillar 6, second rectangular high-refractive-index linear-dielectric pillar 7, nonlinear-dielectric pillar 8 signal A signal B

FIG. 4 is a truth table of logic functions for the 2D PhC cross-waveguide nonlinear cavity shown in FIG. 1.

The present invention is more specifically described in the following paragraphs by reference to the drawings attached only by way of example.

DETAILED DESCRIPTION OF THE EMBODIMENTS

The terms a or an, as used herein, are defined as one or more than one, The term plurality, as used herein, is defined as two or more than two. The term another, as used herein, is defined as at least a second or more.

Figure 1:
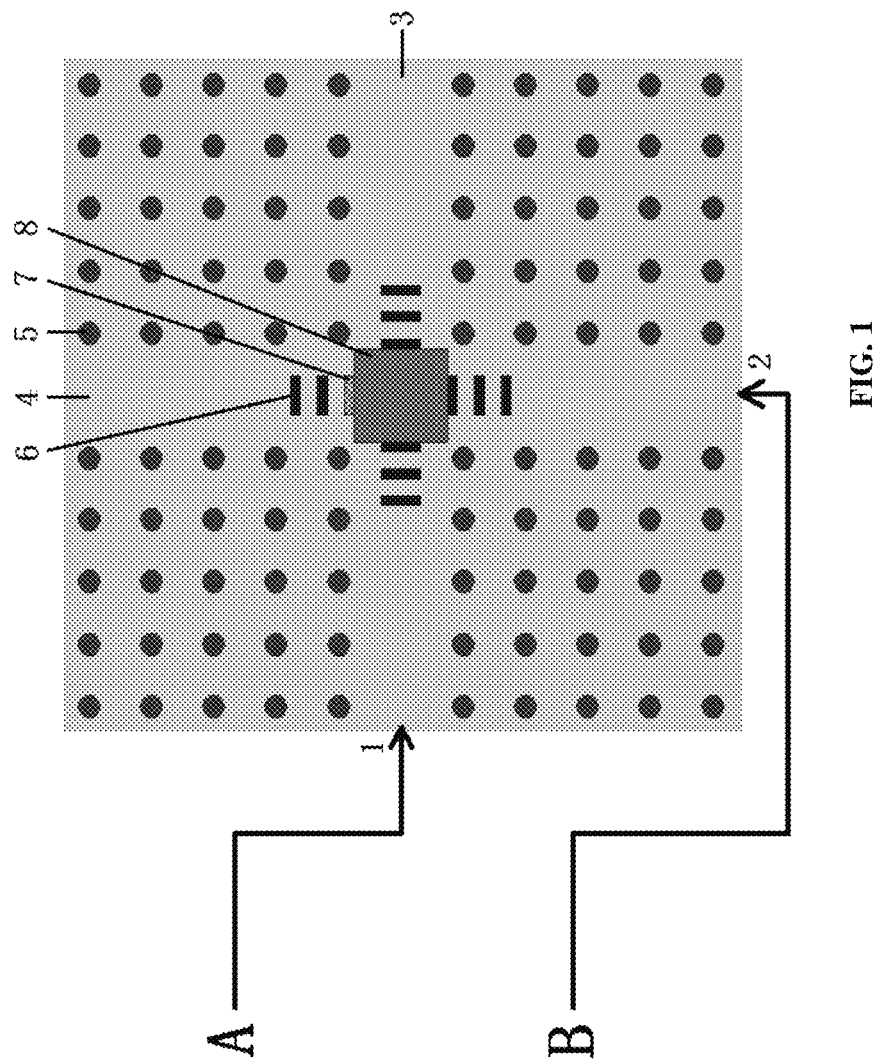
FIG. 1 shows a structural diagram of a PhC memory type all-optical "AOR" logic gate of the present invention.

Referring to FIG. 1, The PhC memory type all-optical "AOR" logic gate of the present invention includes PhC structure, the PhC structure includes two input port, an output port and idle port. The first input port and second input port of a PhC structure are respectively connected with a signal A and a signal B, i.e., the signal A is connected with the first input port 1 of a 2D PhC cross-waveguide nonlinear cavity, and the signal B is connected with the second input port 2 of the 2D PhC cross-waveguide nonlinear cavity. The PhC structure unit 01 is a 2D PhC cross-waveguide nonlinear cavity, the circular high-refractive-index linear-dielectric pillar 5 is made of a silicon (Si) material, and has a refractive index of 3.4, twelve rectangular high-refractive-index linear-dielectric pillars and one square nonlinear-dielectric pillar are arranged in the center of the 2D PhC cross-waveguide nonlinear cavity in the form of a quasi-1D PhC along longitudinal and transverse waveguide directions, the first rectangular high-refractive-index linear-dielectric pillar 6 has a refractive index of 3.4, the second rectangular high-refractive-index linear-dielectric pillar 6 has a dimension equal to that of the first rectangular high-refractive-index linear-dielectric pillar 7; the central nonlinear-dielectric pillar clings to the four adjacent rectangular linear-dielectric pillars and the distance there between is 0, and the central square nonlinear-dielectric pillar 28 is made of a Kerr type nonlinear material, and has a dielectric constant of 7.9 under low-light-power conditions. The high-refractive-index linear-dielectric pillar has a dielectric constant being the same as that of a nonlinear-dielectric pillar under low-light-power conditions, the high-refractive-index linear-dielectric pillars are constituted by a 2D PhC cross-waveguide four-port network, two mutually-orthogonal quasi-1D PhC structures are placed in two waveguide directions crossed at the center of across waveguide, a dielectric pillar is arranged in the middle of the cross waveguide, the dielectric pillar is made of a nonlinear material, and the quasi-1D PhC structures and the dielectric pillar constitute a waveguide defect cavity; and the lattice constant of the 2D PhC array is d, and the array number is 11×11.

The present invention based on the photonic bandgap characteristic, quasi-1D PhC defect state, tunneling effect and optical Kerr nonlinear effect of the 2D PhC cross-waveguide nonlinear cavity, the function of the PhC memory type all-optical "AOR" logic gate can be realized. Introduced first is the basic principle of the PhC nonlinear cavity in the present invention: a 2D PhC provides a photonic bandgap with certain bandwidth, a light wave with its wavelength falling into this bandgap can be propagated in an optical circuit designed inside the PhC, and the operating wavelength of the device is thus set to certain wavelength in the photonic bandgap; the quasi-1D PhC structure arranged in the center of the cross waveguide and the nonlinear effect of the central nonlinear-dielectric pillar together provide a defect state mode, which, as the input light wave reaches a certain light intensity, shifts to the operating frequency of the system, so that the structure produces the tunneling effect and signals are output from the output port 4.

In the two input ports of the 2D PhC cross-waveguide nonlinear cavity as shown in FIG. 1, as a light wave is input to one of the input ports, after the light wave arrives at the center of a PhC cross-waveguide, because the light intensity of the single light wave is not enough to meet defect mode offset of the central nonlinear cavity, the light wave cannot arouse resonance in the cavity and thus cannot produce a tunneling effect, and the light wave is output along the routing input port; as alight wave is simultaneously input to the two input ports, after the light wave arrives at the center of the PhC cross waveguide, the light intensity of the two channels of light wave meets the defect mode offset in the cavity, the light wave arouses resonance in the cavity and thus produces the tunneling effect, and the input light wave in the vertical direction is output from a system output port; at the moment, if the input light wave in the horizontal direction as shown in FIG. 1 is closed, because the central nonlinear cavity at the moment has been in the resonant state and the input light wave in the vertical direction is enough to maintain the resonance in the cavity, the light wave in the vertical direction still can be output from the output port, i.e., the present invention has a memory function.

According to the characteristic of the 2D PhC cross-waveguide nonlinear cavity, the devices of the present invention can realize a memory type all-optical "AOR" logic gate.

The PhC structure of the device of the present invention is a (2k+1)×(2k+1) array structure, where k is an integer more than or equal to 3, Design and simulation results will be provided below in an embodiment given in combination with the accompanying drawings, wherein the embodiment is exemplified by an 11×11 array structure, and design and simulation results are given, taking the lattice constant d of the 2D PhC array being 1 μm and 0.5208 μm respectively as an example.

Embodiment 1

For the lattice constant d of 1 μm and the operating wavelength of 2.976 μm, the circular high-refractive-index linear-dielectric pillar 5 has the radius of 0.18 μm; the first rectangular high-refractive-index linear-dielectric pillar 6 has the long sides of 0.613 μm and short sides of 0.162 μm; the second rectangular high-refractive-index linear-dielectric pillar 7 is as large as the first rectangular high-refractive-index linear-dielectric pillar 6; the central nonlinear-dielectric pillar 8 has the side length of 1.5 μm, and the third-order nonlinear coefficient of $1.33 \times 10^{-2}$ μm$^2$/V$^2$; and the distance between every two adjacent rectangular linear-dielectric pillar s is 0.2668 μm.

Referring to the 2D PhC cross-waveguide nonlinear cavity shown in FIG. 1, a signal A is input to the first input port 1, and a signal B is input to the second input port 2.

Figure 2:
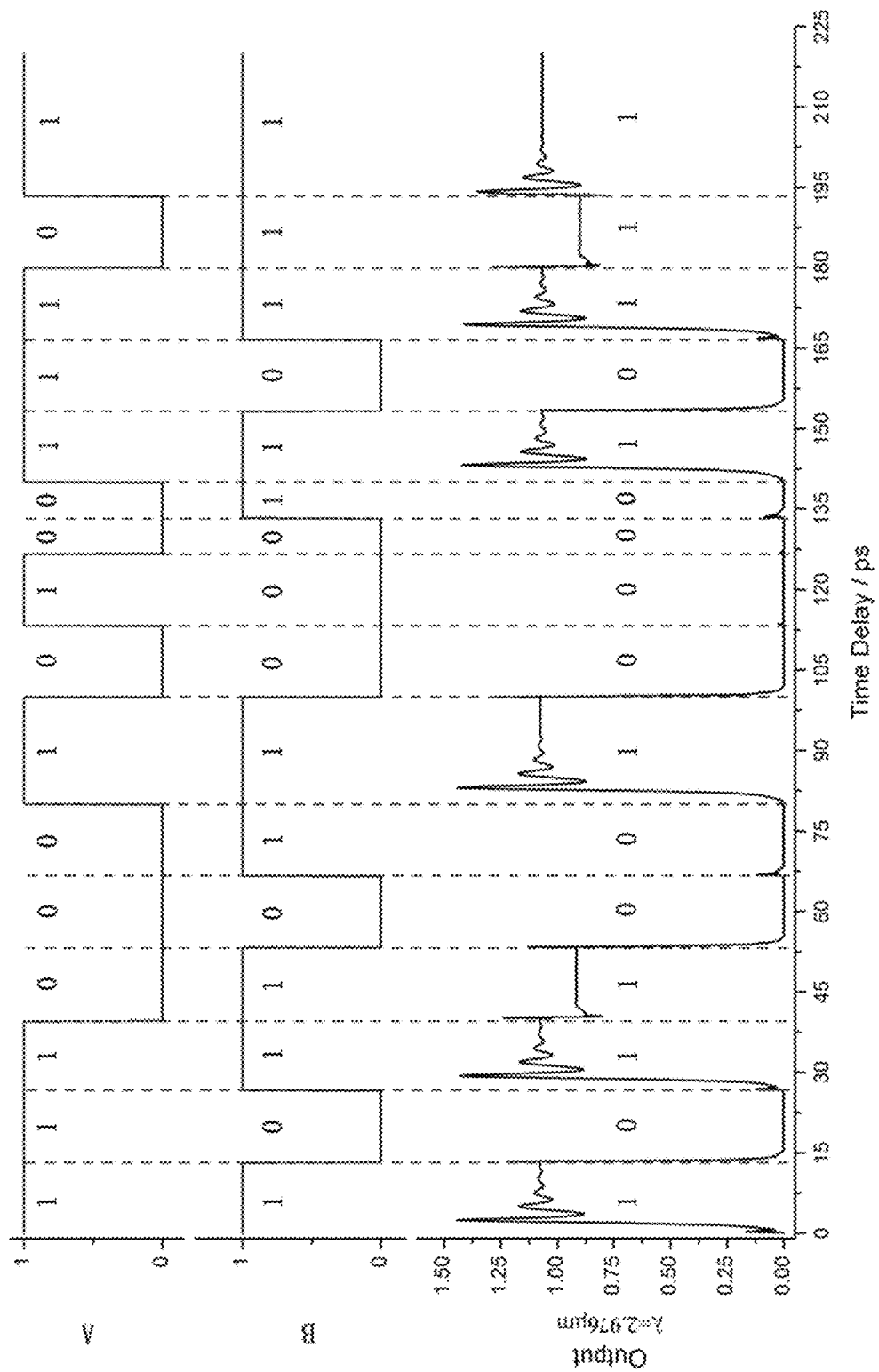
FIG. 2 is a waveform diagram of logic function of the present invention for the lattice constant d of 1 μm and the operating wavelength of 2.976 μm.

For the 2D PhC nonlinear cavity shown in FIG. 1 in the present invention and for the signal wave forms A and B, which are input respectively from the first signal-input port 1 and the second signal-input port 2 in FIG. 1, shown by the upper two diagrams in FIG. 2, the logic output waveforms are obtained and indicated at the lower part in FIG. 2.

A logic operation truth table of the structure shown in FIG. 1 can be obtained according to the logic operation characteristic shown in FIG. 2, as illustrated in FIG. 4. In FIG. 4, C is current state $Q^n$, and Y is signal output of the output port (of the nonlinear cavity unit), i.e., the next state $Q^{n+1}$. A logic expression of the nonlinear cavity unit can be obtained according to the truth table.

$$Y = AB + BC \qquad (1)$$

That is $$Q^{n+1} = B(A + Q^n) \qquad (2)$$

It can be known from the above formula that as the signal A and the signal B are respectively input to the first input port 1 and the second input port 2, the output of the system is equal to the "OR" operation of the signal A and the current state $Q^n$ and the "AND" operation with the signal B. Hence, the output of the system is not only related to the logic input quantities of the signal A and the signal B, but also related to the output $Q^n$ of the system at the last moment.

It can be obtained from formula (2) that for A=1, the output 4 of the system is $$Q^{n+1} = B \qquad (3)$$

That is, the next state of the system is equal to the logic input quantity of the signal B.

For A=0, the output of the system is $$Q^{n+1} = BQ^n \qquad (4)$$

At the moment, the next state of the system is equal to the logic input quantity of the signal B and the output of the system at the last moment, i.e., an "AND" logic operation is made to the output quantity of the current state $Q^n$. That is, the system has a memory function. For the output quantity of the current state $Q^n$ of the system at the last moment being 0, no matter the input quantity of the signal B is a 1 or 0 of setting signal, the output of the system is 0; and for the output quantity of the current state $Q^n$ of the system at the last moment being 1, the output of the system is equal to the logic input quantity of the signal B.

To sum up, the present invention can realize a memory type all-optical "AOR" logic function.

Embodiment 2 when the lattice constant d is 0.5208 μm and the operating wavelength is 1.55 μm, the circular high-refractive-index linear-dielectric pillar 5 has the radius of 0.093744 μm; the first rectangular high-refractive-index linear-dielectric pillar 6 has the long sides of 0.3192504 μm and short sides of 0.0843696 μm; the second rectangular high-refractive-index ear-dielectric pillar 7 is as large as the first rectangular high-refractive-index linear-dielectric pillar 6; the central nonlinear-dielectric pillar 8 has the side length of 0.7812 μm and the third-order nonlinear coefficient of $1.33 \times 10^{-2}$ μm$^2$/V$^2$; and the distance between every two adjacent rectangular linear-dielectric pillars is 0.13894944 μm.

Figure 3:
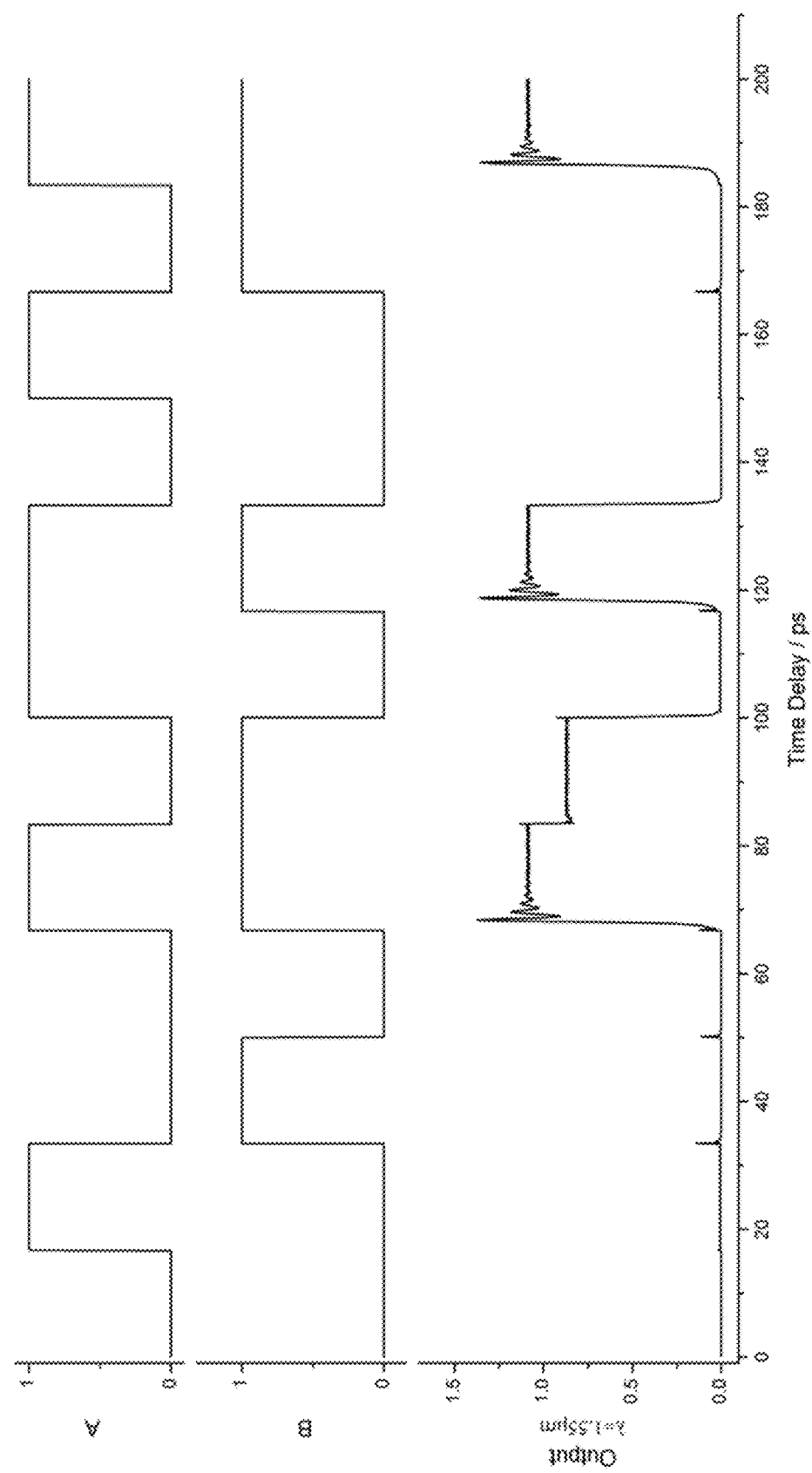
FIG. 3 is a waveform diagram of logic function of the present invention for the lattice constant d of 0.5208 μm and the operating wavelength of 1.55 μm.

Based on the above dimension parameters, for a signal A and a signal B with the waveforms shown in FIG. 3 are respectively input to the first input port 1 and the second input port 2, output waveform diagrams at the lower part of FIG. 3 can be obtained. It can be known from the logic relation between the input and the output shown in FIG. 3 that the present invention can also realize the memory type all-optical "AOR" logic function shown in formula (2) of embodiment 1 by scaling.

Based on the above two embodiments, the device of the present invention can realize the same logic function by scaling under different lattice constants and corresponding working wavelengths In conclusion, the devices of the present invention can realize the memory type all-optical "OR AND" logic function.

While the invention has been described in terms of various specific embodiments, those skilled in the art will recognize that the invention can be practiced with modification within the spirit and scope of the claims.

What is claimed is:

1. A photonic crystal (PhC) memory type all-optical "AND OR (AOR)" logic gate, comprising:
   a PhC structuret; and further comprising:
   two input port, an output port and an idle port; a first input end and a second input end of said PhC structure are respectively connected with a signal A and a signal B; the PhC structure is a two-dimensional (2D) PhC cross-waveguide nonlinear cavity, twelve rectangular high-refractive-index linear-dielectric pillars and a square nonlinear-dielectric pillar are arranged in a center of the 2D PhC cross-waveguide nonlinear cavity in a form of a quasi-one-dimensional (quasi-1D) PhC along longitudinal direction in vertical waveguide and transverse direction in horizontal waveguide.

2. The PhC memory type all-optical "AOR" logic gate of claim 1, wherein the square nonlinear-dielectric pillar clings to adjacent four rectangular high-refractive-index linear-dielectric pillars, and said square nonlinear-dielectric pillar is made of a Kerr type nonlinear material, and has a dielectric constant of 7.9 under low-light-power conditions and the four rectangular high-refractive-index linear-dielectric pillars have a dielectric constant consistent with that of the square nonlinear-dielectric pillar under low-light-power conditions.

3. The PhC memory type all-optical "AOR" logic gate of claim 1, wherein high-refractive-index linear-dielectric pillars constitute a 2D PhC cross intersected waveguide four-port network, two mutually-orthogonal quasi-1D PhC structures are placed along longitudinal direction in vertical waveguide and transverse direction in horizontal waveguide through a center of a cross-waveguide, the square nonlinear-dielectric pillar is arranged in a middle of said cross-waveguide, and is made of a nonlinear material, and said quasi-1D PhC structure and the square nonlinear-dielectric pillar constitute a waveguide defect cavity.

4. The PhC memory type all-optical "AOR" logic gate of claim 1, wherein said PhC is a (2k+1)×(2k+1) array structure, where k is an integer more than or equal to 3.

5. The PhC memory type all-optical "AOR" logic gate of claim 2, wherein a cross section of the high-refractive-index linear-dielectric pillar of said 2D PhC is circular, elliptic, triangular, or polygonal.

6. The PhC memory type all-optical "AOR" logic gate of claim 1, wherein a background filling material for said 2D PhC includes air and a different-from-air low-refractive-index dielectric having a refractive index less than 1.4.

7. The PhC memory type all-optical "AOR" logic gate of claim 3, wherein a cross section of rectangular high-refractive-index linear-dielectric pillars of the cross-waveguide is polygonal, circular, or elliptic.

8. The PhC memory type all-optical "AOR" logic gate of claim 3, wherein a cross section of rectangular high-refractive-index linear-dielectric pillars of the cross-waveguide is rectangular.

9. The PhC memory type all-optical "AOR" logic gate of claim 3, wherein rectangular high-refractive-index linear-dielectric pillars of the cross-waveguide have a refractive index with a different value more than 2.

10. The PhC memory type all-optical "AOR" logic gate of claim 3, wherein rectangular high-refractive-index linear-dielectric pillars of the cross-waveguide have a refractive index of 3.4.

11. The PhC memory type all-optical "AOR" logic gate of claim 3, wherein a cross section of the square nonlinear-dielectric pillar is polygonal, circular, or elliptic.

12. The PhC memory type all-optical "AOR" logic gate of claim 3, wherein a cross section of the square nonlinear-dielectric pillar is square.

* * * * *